United States Patent
Bedrosian (10) Patent No.: US 7,848,242 B2
(45) Date of Patent: Dec. 7, 2010

(54) METHODS AND APPARATUS FOR TESTING ADAPTIVE TIMING CHARACTERISTICS OF PACKET-BASED TIMING PROTOCOL

(75) Inventor: P. Stephan Bedrosian, Andover, PA (US)

(73) Assignee: Agere Systems Inc., Allentown, PA (US)

( * ) Notice: Subject to any disclaimer, the term of this patent is extended or adjusted under 35 U.S.C. 154(b) by 594 days.

(21) Appl. No.: 11/762,808

(22) Filed: Jun. 14, 2007

(65) Prior Publication Data
US 2008/0310447 A1 Dec. 18, 2008

(51) Int. Cl.
*H04L 12/28* (2006.01)
(52) U.S. Cl. .................................... 370/241
(58) Field of Classification Search ............... 370/503, 370/468, 252, 238, 389, 395.42, 241–245, 370/254, 401, 402; 709/227, 228, 246, 248
See application file for complete search history.

(56) References Cited

U.S. PATENT DOCUMENTS

| | | | | |
|---|---|---|---|---|
| 6,028,846 | A * | 2/2000 | Cain | 370/250 |
| 6,151,325 | A * | 11/2000 | Hluchyj | 370/398 |
| 7,443,801 | B2 * | 10/2008 | Neidhardt et al. | 370/238 |
| 7,633,939 | B2 * | 12/2009 | Curran-Gray et al. | 370/389 |
| 2002/0015387 | A1 * | 2/2002 | Houh | 370/250 |
| 2006/0109789 | A1 * | 5/2006 | Skerritt | 370/238 |
| 2006/0221845 | A1 * | 10/2006 | Winters | 370/250 |
| 2008/0080563 | A1 * | 4/2008 | Kataria et al. | 370/503 |
| 2008/0151771 | A1 * | 6/2008 | Dowse | 370/252 |

OTHER PUBLICATIONS

S.S. Al-Wakeel et al., "Performance Modeling of a Telecommunications Network with Internet Traffic," Proceedings of the IASTED International Conference Applied Simulation and Modelling, Sep. 2003, pp. 419-424, Spain.
S. Kaczmarek et al., "Methods for Evaluation Packet Delay Distribution of Flows Using Expedited Forwarding PHB," Journal of Telecommunications and Information Technology, Feb. 2004, pp. 29-37.
H-A. Lin, "Handoff for Multi-Interfaced 802 Mobile Devices," IEEE P802 Handoff ECSG, May 2003, 7 pages.
R. Sojka, "Implementing a Program to Calculate IPDV," http://www.ripe.net/projects/ttm/Documents/Various/rsojka2, Dec. 2001, pp. 1-26.
D. Munoz et al., "Heavy Tail Jitter in Mobile Packet Networks," Vehicular Technology Conference (VTC), 2001, pp. 2224-2228, vol. 3.
D. Loukatos et al., "An Approach to the Quantification of Delay Variation Effects on Live Audio Streams," 10th International Conference on Telecommunications ICT, Feb.-Mar. 2003, pp. 536-542, vol. 1.

(Continued)

*Primary Examiner*—Dmitry H Levitan
(74) *Attorney, Agent, or Firm*—Ryan, Mason & Lewis, LLP (57) ABSTRACT

Methods and apparatus for testing adaptive timing characteristics of a packet-based timing protocol are provided. A packet delay variation test sequence is applied to packet-based traffic as the packet-based traffic passes through a packet delay variation generator during transmission between nodes. Adaptive timing characteristics at a node that receives the packet-based traffic are evaluated in accordance with the packet delay variation test sequence.

19 Claims, 7 Drawing Sheets

OTHER PUBLICATIONS

T. Ferrari, "End-to-End Performance Analysis with Traffic Aggregation," Computer Networks: The International Journal of Computer and Telecommunications Networking, Dec. 2000, 7 pages, vol. 34, issue 6, Portugal.

K. Fujimoto et al., "Statistical Analysis of Packet Delays in the Internet and its Application to Playout Control for Streaming Applications," IEICE Trans. on Communications, Jun. 2001, pp. 1-9, vol. E00-B, No. 6.

D. Veitch et al., "Robust Synchronization of Software Clocks Across the Internet," Proceedings of the 4th ACM SIGCOMM Conference on Internet Measurement Conference (IMC), Oct. 2004, pp. 219-232, Italy.

E.J. Daniel et al., "An Inter-Arrival Delay Jitter Model Using Multi-Structure Network Delay Characteristics for Packet Networks," Proceedings of the 37th Asilomar Conference on Signals, Systems, and Computers, Nov. 2003, 5 pages.

* cited by examiner

METHODS AND APPARATUS FOR TESTING ADAPTIVE TIMING CHARACTERISTICS OF PACKET-BASED TIMING PROTOCOL

FIELD OF THE INVENTION

The present invention relates generally to packet-based networks and, more particularly, to adaptive time transfer protocols for packet-based networks.

BACKGROUND OF THE INVENTION

During operation, telecommunication equipment requires timing synchronization for proper communication purposes. Traditional synchronization methods utilize expensive specialized circuits to provide synchronization signals. Currently, with the prevalence of packet-based networks, such as, for example, Ethernet, cost can be reduced for timing synchronization by transmitting timing synchronization signals between telecommunication equipment within the packet-based network. However, due to the store-and-forward operation of packet-based networks, the packets carrying the synchronization information will experience an uncertain delay, which will affect the accuracy of the synchronization. This uncertainty in delay is commonly referred to as packet delay variation (PDV). To improve timing synchronization accuracy, it is necessary for such delay to be significantly reduced or eliminated.

A circuit emulation service (CES) is defined as the transport of a time-division multiplexing (TDM) based service over a packet-based network. The key for successful CES transport is the preservation of the TDM-based service clock between interworking functions (IWFs). CES timing recovery methodologies fall into two categories: differential and adaptive. The differential timing relies on the presence of an external high quality timing reference at each IWF to measure and reconstruct the service clock. The adaptive timing relies on reconstructing the service clock through statistical methods based on packet arrival at the egress IWF.

Timing emulation service (TES) also transports timing information over a packet-based network. However, this service is not associated with the transport of a TDM-based service. TES is implemented by a unique IWF, different from the CES IWF, which transports timing information suitable for several different applications:

Syntonization—Frequency information is transported. The maximum time interval error (MTIE) of the recovered timing service will be unbounded but controlled.

Synchronization—Both frequency and phase information are transported. MTIE of the recovered timing service will be bounded and controlled.

Time-of-day—Timing information will be sent between IWFs related to a time-of-day source, such as, for example, a time stamp, that represents a time value relative to an epoch and a counting rate.

The performance of adaptive time transfer protocols is influenced by packet delay and delay variation. Such protocols send timing information as a series of time-bearing packets over a packet switched facility. If these time-bearing packets are sent in one direction, from a timing server to a timing client, the overall delay that these packets experience in the network results in a timing offset at the timing client. If the delay is constant, then there will be a constant time error between the timing server and the timing client. However, if the delay varies, then this delay variation will also be present in the timing information recovered by the timing client.

Adaptive time transfer protocols that are capable of transferring time-bearing packets in two directions of communication (two-way mode) are capable of measuring the round-trip delay between the timing client and the timing server. If the round-trip delay is then divided by two, an estimate of the one-way delay may then be made. Examples of adaptive time transfer protocols that operate in this two-way mode are IEEE 1588 version 1 (V1) and version 2 (V2), as well as network time protocol (NTP).

However, the ability of these two-way protocols to accurately provide correct timing information at the timing client is dependent on two basic factors. The first factor is the symmetry of the delay characteristics from the timing server to the timing client and from the timing client to the timing server. The second factor is the rate of change of these delay characteristics relative to the exchange of messages between the timing server and timing client.

Delay symmetry between the timing server and timing client is typically influenced by the residence time that these time-bearing packets spend in intermediate switches in the network. Although there are techniques to measure the residence time and make on-the-fly corrections, see, for example, IEEE 1588 V2, such corrections must be done at each intermediate node that passes these time-bearing packets. Delay asymmetries may be caused by a number of factors including intermediate switch loading, asymmetric packet traffic patterns, or even different packet routes.

The characteristics of the delay asymmetry are also very important. If an asymmetry is fixed, it will result in stable timing offset at the timing client. In this case, MTIE and recovered frequency will be stable. If the timing client is providing its recovered timing information for telecom applications, DS1/E1 slip buffers will not overflow or underflow under stable asymmetric conditions in packet-based networks.

Variation in delay asymmetry, however, may cause the MTIE of the recovered timing at the timing client to change. In the case of the one-way adaptive timing protocol, PDVs will be directly transferred to timing changes at the timing client. If rate of change of the delay variation is particularly slow, such as variations of hours, days, or longer, the recovered MTIE will tend to track the PDV.

Two-way timing protocols that are able to measure the round trip delay may not be able to accurately measure the one-way delay or delay variation. Such measurement errors will also result in the production of wander at the client IWF due to these PDV events. Therefore, the relationship between network PDV and the resulting timing performance (wander generation) of adaptive protocols needs to be better understood.

Since network PDV can adversely affect the timing performance of adaptive time-transfer protocols, such as, for example, IEEE 1588 V1, V2, NTP, etc., a series of tests that directly correlate timing performance at the timing client to PDV are also needed.

Timing performance tests mentioned in the appendix of ITU-G.8261 standard are based on packet loading in a series of Ethernet switches. Though this type of loading will cause PDV, it is not deterministic in nature. Dependencies on the switch design, actual data traffic and other factors will cause the actual PDV of packet traffic to possess these indeterminate properties.

Accordingly, efficient and controlled approaches are needed for the testing and evaluation of adaptive timing characteristics of packet-based timing protocols. More specifically, a need exists for the evaluation of the timing recovery performance of CES and TES systems.

SUMMARY OF THE INVENTION

The present invention provides techniques for testing adaptive timing characteristics of a packet-based timing protocol.

In accordance with one aspect of the invention, a method of testing adaptive timing characteristics of a packet-based timing protocol is provided. A packet delay variation test sequence is applied to packet-based traffic as the packet-based traffic passes through a packet delay variation generator during transmission between nodes. Adaptive timing characteristics are evaluated at a node that receives the packet-based traffic in accordance with the packet delay variation test sequence.

In an illustrative embodiment, packet-based traffic between nodes may be intercepted at the packet delay variation generator. At least one of packet delay and packet delay variation of the packet-based traffic may be changed at the packet delay variation generator in accordance with the packet delay variation test sequence. Packet-based traffic may be transmitted from the packet delay variation generator in accordance with at least one of the changed packet delay and the changed packet delay variation. The packet delay variation test sequence may comprise at least one of a single packet delay variation event, a continuous packet delay variation event and a test suite.

In another aspect of the present invention, an integrated circuit device is provided in a packet delay variation generator for testing adaptive timing characteristics of a packet-based timing protocol. The integrated circuit device is configured to apply a packet delay variation test sequence to packet-based traffic as the packet-based traffic passes through a packet delay variation generator during transmission between nodes. Adaptive timing characteristics can be evaluated at a node that receives the packet-based traffic in accordance with the packet delay variation test sequence.

In a further aspect of the present invention, a packet-based network is provided having a plurality of nodes between which packet-based traffic is passed, and a packed delay variation generator comprising an integrated circuit device. The integrated circuit device is configured to apply a packet delay variation test sequence to packet-based traffic as the packet-based traffic passes through a packet delay variation generator during transmission between nodes. Adaptive timing characteristics are evaluated at a node that receives the packet-based traffic in accordance with the packet delay variation test sequence These and other features and advantages of the present invention will become apparent from the following detailed description of illustrative embodiments thereof, which is to be read in connection with the accompanying drawings.

DETAILED DESCRIPTION

As will be described in detail below, the present invention in the illustrative embodiment relates generally to the field of packet-based networks and, more particularly, to improved techniques for the testing of adaptive timing characteristics of packet-based transfer protocols for packet-based networks. Embodiments of the present invention introduce the concept of using explicitly defined PDV test sequences to evaluate timing recovery performance of CES and TES systems. These test sequences are intended to deterministically generate packet delay and variable delay events that represent stress or worst case packet-based network transport conditions. The PDV test sequences are represented in three distinct groupings: single PDV events, continuous PDV events, and test suites.

Rather than rely on the propagation of background traffic through a series of Ethernet switches to create PDV, a more efficient approach is to create a deterministic delay variation of the CES and TES packets directly. Such a concept could be thought of as scheduling the Ethernet traffic such that the arrival of these packets at the destination will follow a pre-defined delay profile. Such a profile will be described in terms of actual delay and rate of change, relative to the delay value of the previous packet.

One example of using deterministic delay sequences is the creation of specific stress tests used to evaluate the timing recovery performance of the client node. In this way, the specific delay and delay variation parameters may be changed in a repeatable and reliable way. Likewise, the MTIE, time deviation (TDEV) or other timing evaluation parameters may be specified as evaluation criteria.

The embodiments of the present invention describe various aspects of PDV generation test methods. Such methods are used to modify the delay characteristics of packet-based traffic. The traffic payload will pass transparently through a PDV generator with only the packet delay and delay variation being changed. By allowing the user to select or specify a particular delay profile, timing recovery by a CES or TES IWF may be analyzed. Moreover, by having the ability to generate the same deterministic profile for a variety of tests, the merits of different CES or TES recovery algorithms may be accurately accessed.

Figure 1:
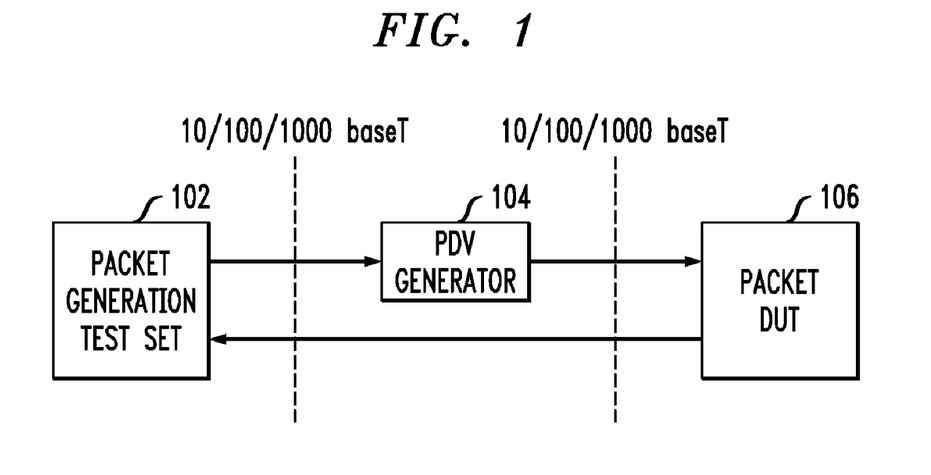
FIG. 1 is a diagram illustrating PDV generation in one direction of transmission of a packet stream, according to an embodiment of the present invention.

Referring initially to FIG. 1, a diagram illustrates PDV generation in one direction of transmission of a packet stream, according to an embodiment of the present invention. A packet generator 102 transmits a packet stream through a PDV generator 104 to a packet device under test (DUT) 106 via a networking standard supporting specified transfer rates, such as, for example, 10/100/1000Base-T. A packet stream is returned from packet DUT 106 to packet generator 102, bypassing PDV generator 104.

Figure 2:
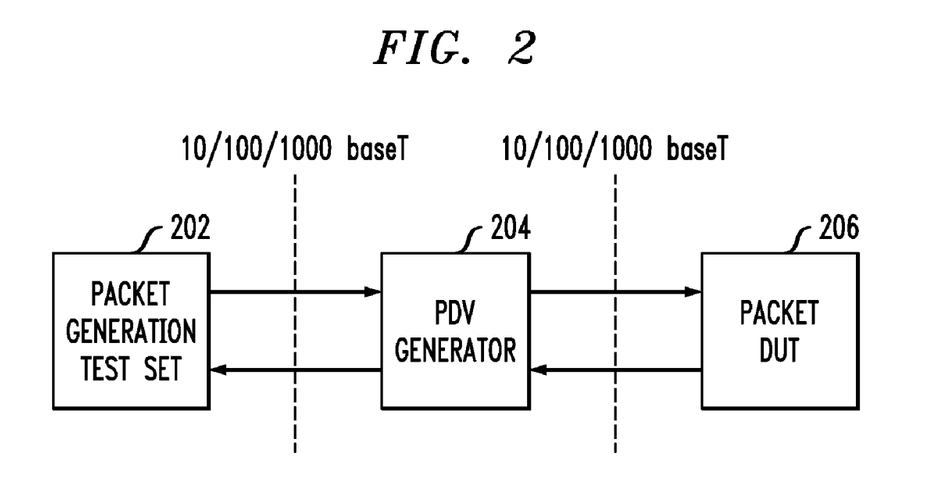
FIG. 2 is a diagram illustrating PDV generation in two directions of transmission of a packet stream, according to an embodiment of the present invention.

In FIG. 2, according a second embodiment of the present invention, a diagram illustrates PDV generation in two directions of transmission of a packet stream. A packet generator 202 transmits a packet stream through a PDV generator 204 to a packet DUT 206. Similarly, packet DUT 206 transmits a packet stream through PDV generator 204 to packet generator 202. Delay characteristics in opposing directions may be the same or different.

Figure 3:
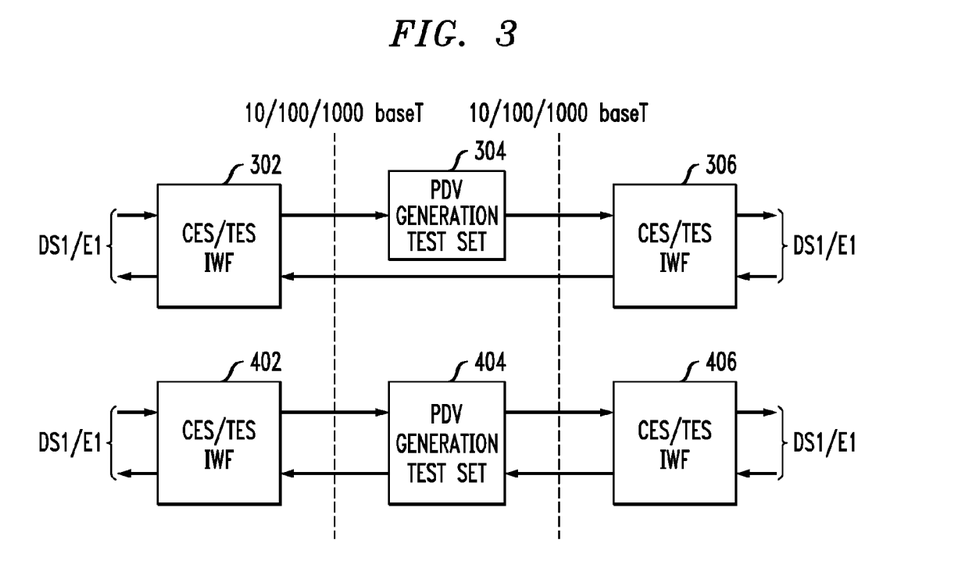
FIG. 3 is a diagram illustrating PDV generation supporting CES/TES testing, according to an embodiment of the present invention.

With regard to FIG. 3, PDV generation supporting CES/TES testing is shown, according to an embodiment of the present invention. A first CES/TES IWF 302 transmits a packet stream through PDV generation test set 304 to a second CES/TES IWF 306. A packet stream is returned from second CES/TES IWF 306 to first CES/TES IWF 302, bypassing PDV generation test set 304. Further, in FIG. 3, a third CES/TES IWF 402 transmits a packet stream through a PDV generation test set 404 to a fourth CES/TES IWF 406. Similarly, fourth CES/TES IWF 406 transmits a packet stream through PDV generation test set 404 to third CES/TES IWF 402. For CES testing, the emulated DS1 or E1 timing characteristics may be compared against a specific MTIE requirement as specified in G.8261.

The packet generators, DUTs and IWFs of FIGS. 1-3 may be considered nodes of a packet-based network in accordance with the embodiments of the present invention. Further, a PDV generator may be located between nodes in the packet-based network, at its own node in the network, or at a node in the network that also includes a packet generator, DUT or IWF.

The key aspect of the PDV generator is the ability to generate PDV of various profile types. These profiles may fall into specific categories, such as, for example, step delay changes, pulse delay changes, ramp delay changes and periodic delay changes.

Figure 4:
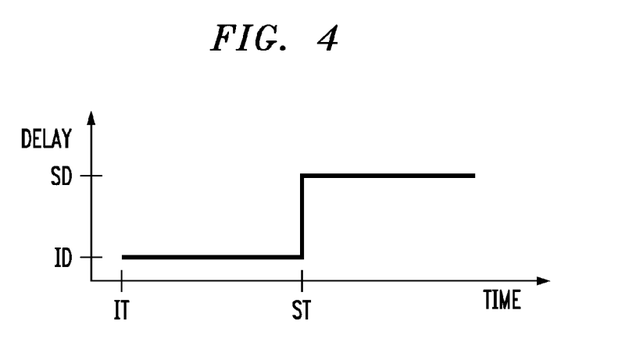
FIG. 4 is a diagram illustrating an example of a step delay change, according to an embodiment of the present invention.

The diagram of FIG. 4 illustrates an example of a step delay change, which may be a positive or negative change in phase that occurs instantaneously with a specified magnitude at a specified time. This event is characteristic of packets that experience a change in routing due to a simple protection switch through a packet switch or router. Delay begins at a start delay level ID and at start time IT. At step time ST, the delay is changed from start delay level ID to step delay level SD. Start delay level ID and step delay level SD may be defined as +/−20 milliseconds (ms) in 20 microsecond (μs) steps. Start time IT may be defined as 0 to 900 seconds in 1 second steps, and step time ST may be defined as 0 to 1000 seconds in 1 second steps.

Figure 5:
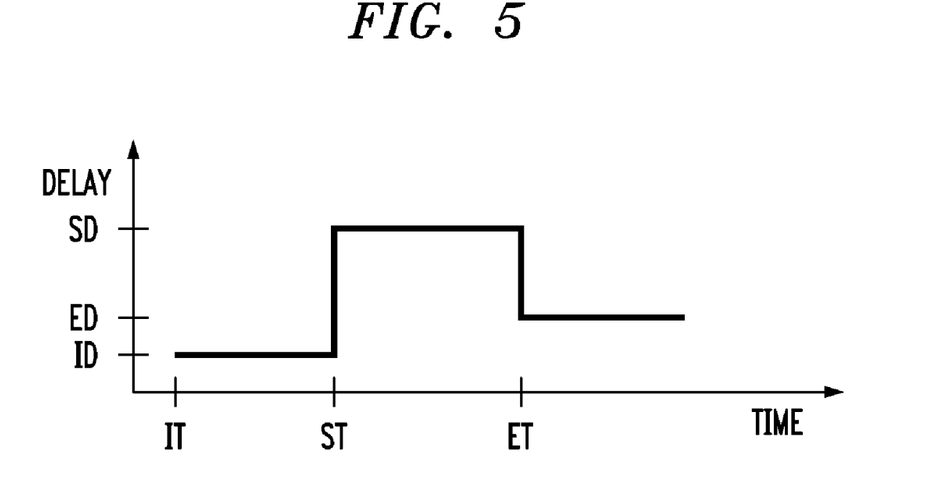
FIG. 5 is a diagram illustrating an example of a pulse delay change, according to an embodiment of the present invention.

Referring now to FIG. 5, a diagram illustrates an example of a pulse delay change, which may be a positive or negative change in phase that occurs instantaneously with a specified magnitude at a specified time. This event is characteristic of packets that experience a change in routing due to a revertive protection switch. In this case the delay variation is cause by route changes from a failed path to a protection path. Delay begins at start delay level ID and start time IT. At start step time ST, the delay increases to step delay level SD. At end step time ET, the delay decreases from step delay level SD to end delay level ED. Start delay level ID and step delay level SD may be defined as +/−20 ms in 20 μs steps. End delay level ED may be defined as +/−20 ms in 78 μs steps (512 levels). Start time IT may be defined as 0 to 900 seconds in 1 second steps. Start step time ST may be defined as IT+(0 to 1000) seconds in 1 second steps. End step time ET may be defined as ST+(1 to 10000) seconds in 1 second steps.

Figure 6:
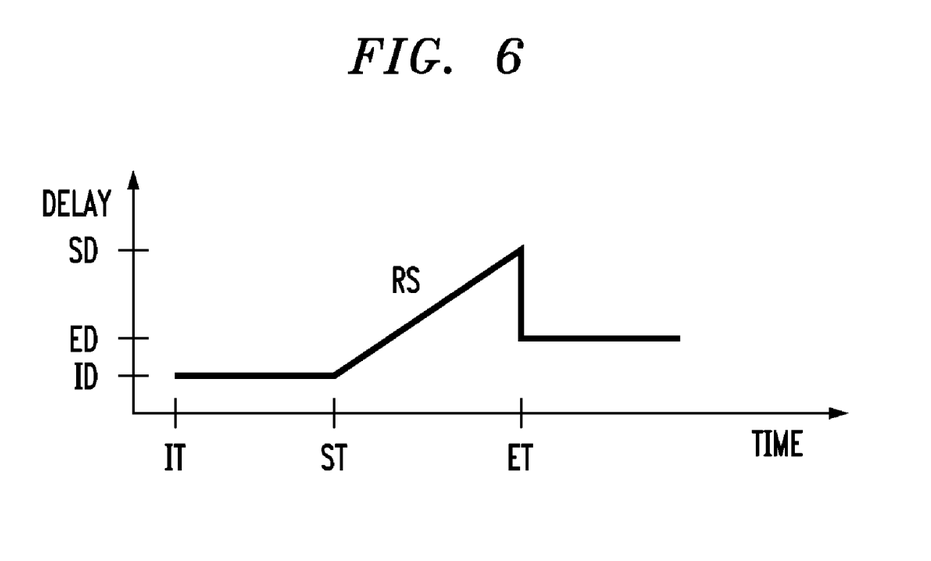
FIG. 6 is a diagram illustrating an example of a ramp delay change, according to an embodiment of the present invention.

FIG. 6 shows a diagram illustrating an example of a ramp delay change, which may occur over many consecutive packet delays. These events are characteristic of delays caused by buffer fills, such as, for example, overflow or underflow in intermediate packet switches. The delay begins at start delay level ID and start time IT. At start ramp time ST the delay increases along start ramp slope RS until end step time ET at step delay level SD, where delay decreases to end delay level ED. Start delay level ID and step delay level SD may be defined as +/−20 ms in 20 μs steps. Start ramp slope RS may be defined as +/−20,000 nanoseconds (ns) per second. End delay level ED may be defined as +/−20 ms in 20 μs steps. Start time IT may be defined as 0 to 900 seconds in 1 second steps and start ramp time ST may be defined as IT+(0 to 1000) seconds in 1 second steps. End step time ET may be defined as ST+(1 to 1000) seconds in 1 second steps.

Figure 7:
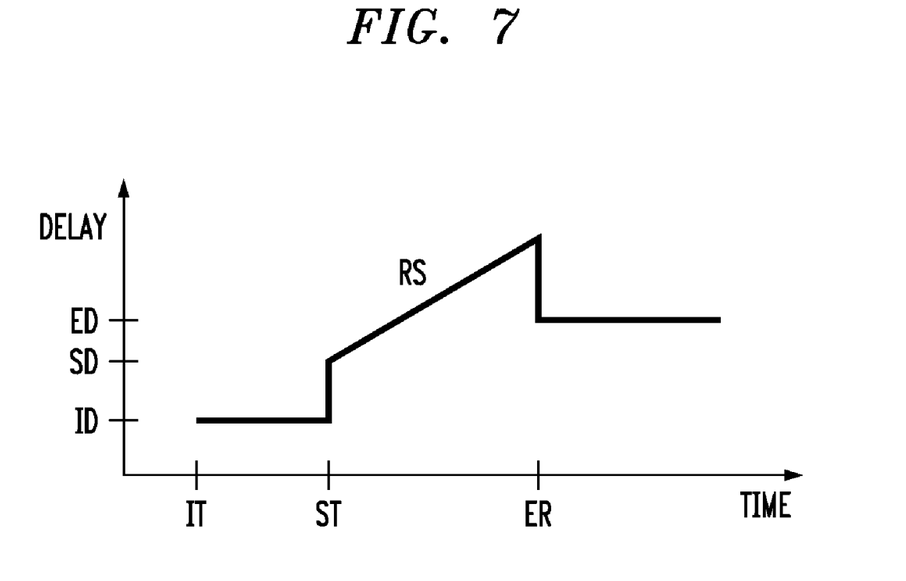
FIG. 7 is a diagram illustrating an example of a step-ramp change sequence, according to an embodiment of the present invention.

The diagram of FIG. 7 illustrates an example of a step-ramp change sequence. Delay begins at start delay level ID and start time IT. At start step time ST, delay increases from start delay level ID to step delay level SD. The delay then increases from step delay level SD along a start ramp slope RS until end ramp time ER, where delay drops to end delay level ED. Start delay level ID, step delay level SD, and end delay level ED may be defined as +/−20 ms in 20 μs steps. Start ramp slope may be defined as +/−20,000 ns per second. Start time IT may be defined as 0 to 900 seconds in 1 second steps. Start step time ST may be defined as 0 to 1000 seconds in 1 second steps. End ramp time ER may be defined as ST+(1 to 1000) seconds in 1 second steps.

Figure 8:
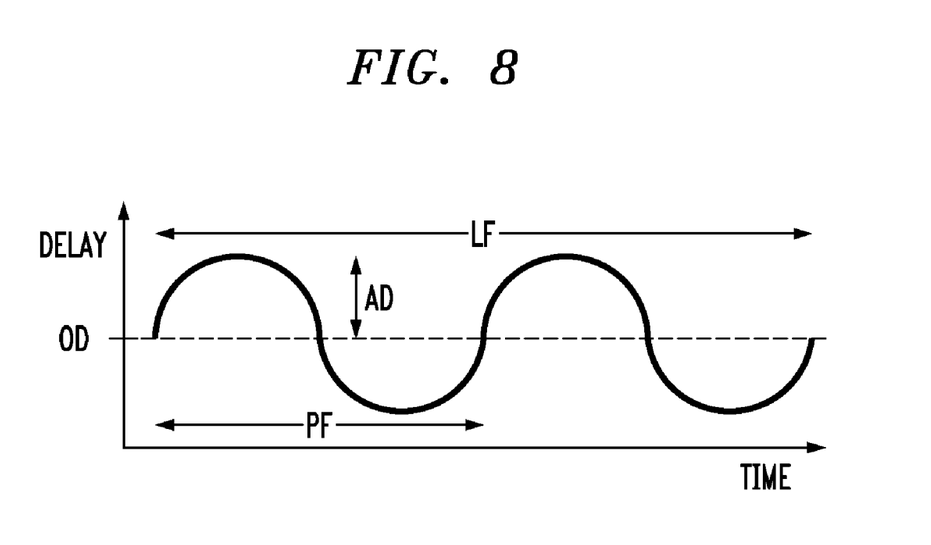
FIG. 8 is a diagram illustrating an example of a periodic delay change as a sine function, according to an embodiment of the present invention.
Figure 9:
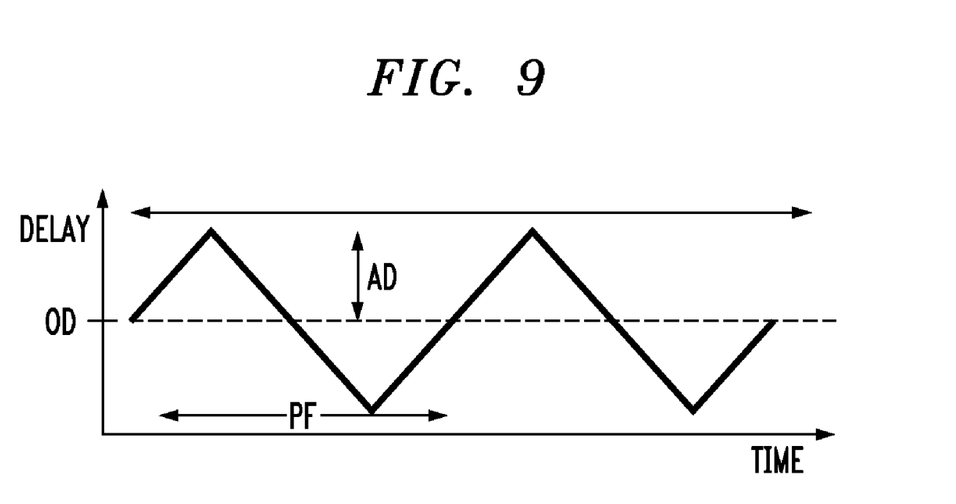
FIG. 9 is a diagram illustrating an example of a triangular periodic delay change, according to an embodiment of the present invention.
Figure 10:
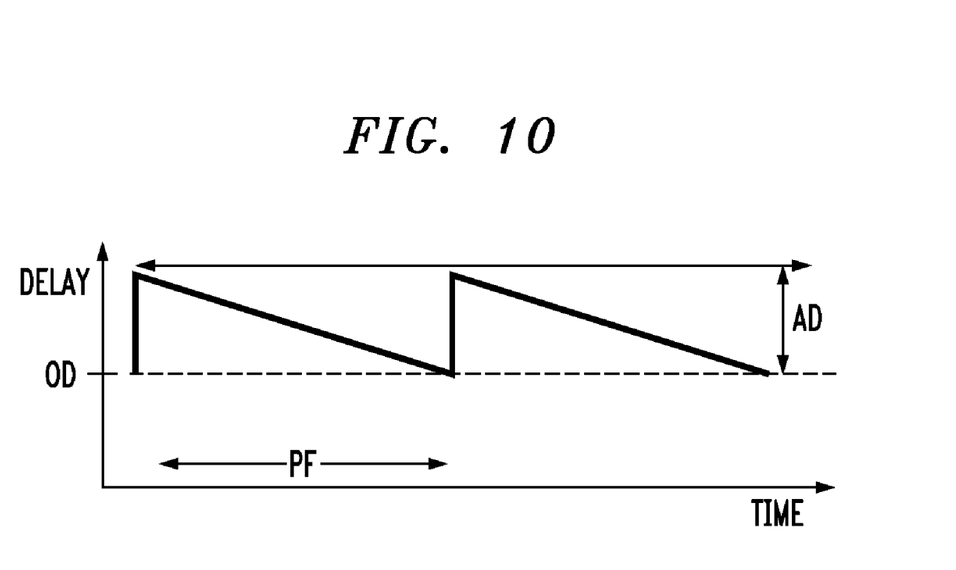
FIG. 10 is a diagram illustrating an example of a saw-tooth periodic delay change, according to an embodiment of the present invention.
Figure 11:
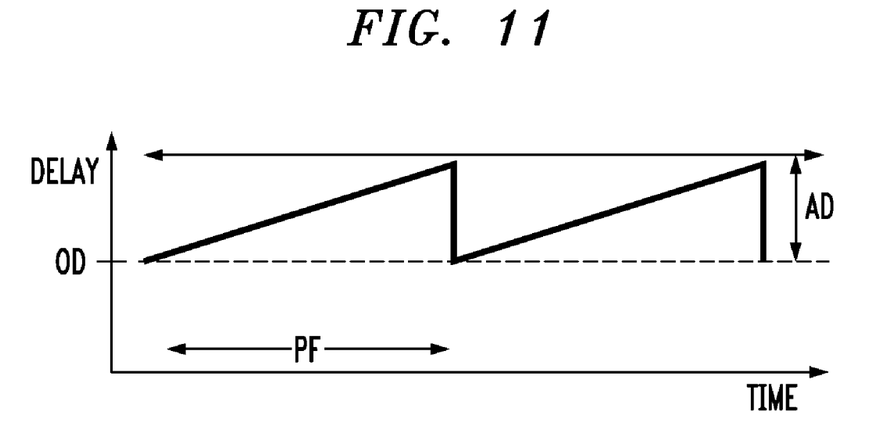
FIG. 11 is a diagram illustrating an example of a shark-fin periodic delay change, according to an embodiment of the present invention.
Figure 12:
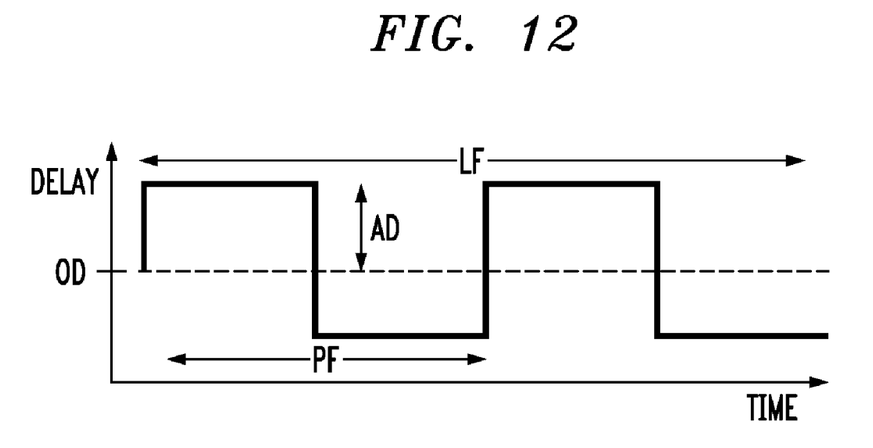
FIG. 12 is a diagram illustrating an example of a square wave periodic delay change, according to an embodiment of the present invention.

Referring now to FIG. 8, a diagram illustrates an example of a periodic delay change. Periodic delay changes occur in a repeated pattern with a specific amplitude and period. A sine function is shown as an example. These changes are characteristic of variable loading in intermediate switches. The technique of using sine waves to modulate data delay characteristics is typically used to evaluate timing systems. For example, jitter tolerance is based on modulating the significant instants of data traffic with a sine wave pattern. A similar PDV tolerance test could be done with periodic PDV patterns where the period and amplitude could be swept and changed to evaluate PDV tolerance over frequency.

In addition to the periodic delay change sequence of FIG. 8, FIGS. 9-12 are diagrams illustrating examples of triangular, saw-tooth, shark-fin and square wave periodic delay change sequences, respectively, according to embodiments of the present invention. A delay offset level OD and a delay amplitude level AD may be defined as +/−20 ms in 20 μs steps. A function period PF may be defined as 10 to 100,000 seconds in 1 second steps. A function length LF may be defined as 10 to 100,000 seconds in 1 second steps or continuous.

Figure 13:
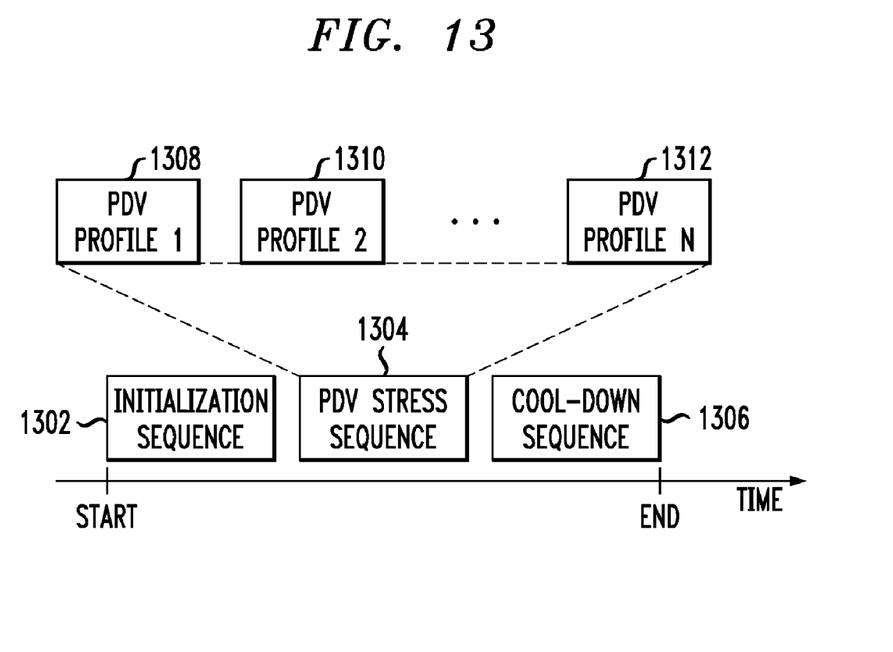
FIG. 13 is a flow diagram illustrating a PDV test suite, according to an embodiment of the present invention.

With regard to FIG. 13, a diagram illustrates a PDV test suite, according to an embodiment of the present invention. Test suites may be constructed using the above PDV profiles. Such sequences could be used to automate the testing process. A test sequence would consist of an initialization sequence or period 1302, a delay variation sequence 1304, and a final coot-down sequence or period 1306.

Initialization period 1302 is the period before the actual testing begins. During this time, the packet-based timing protocol is allowed to achieve a working session between the client and server. In addition, the actual delay and delay variation of the packet exchange between client and server could be kept at a steady state value or allowed to vary in a deterministic pattern. For example, the delay could be kept at a constant value during this period to simulate a best case start-up condition. Likewise, the packet delay could experience deterministic changes during this initialization period (step, pulse, ramp, periodic) to evaluate start-up performance during stressed conditions.

Delay variation sequence 1304 is the actual test condition exercised by one or more of the PDV test sequences previously described. The delay variation sequence could be as simple as a single step change, or could be a combination of a variety of sequential PDV profiles 1308, 1310, 1312. Again, these sequences would be targeted to generate a specific stress condition(s) for the purposes of measuring performance to a specific evaluation criterion, such as, for example, an MTIE stress test mask.

Cool down sequence 1306 is part of the test sequence that is used to exhibit a less stressful condition, such as, for example, zero or low values of PDV. The purpose of the part of the test sequence is to verify a transient timing performance after a stress event. This will be useful for measuring how quickly the timing performance achieves a non-stressed evaluation criterion, such as, for example, MTIE of a non-stressed test mask.

Figure 14:
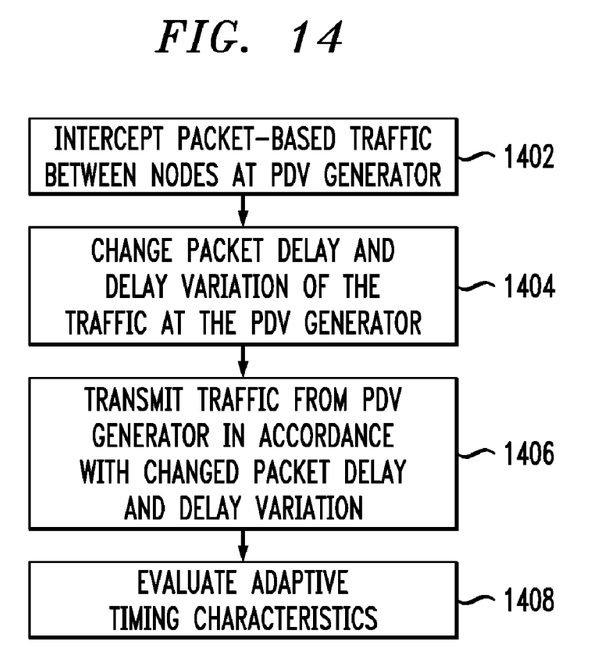
FIG. 14 is a diagram illustrating a testing methodology for adaptive timing characteristics of a packet-based timing protocol, according to an embodiment of the present invention.

Finally, in FIG. 14, a flow diagram illustrates a testing methodology for adaptive timing characteristics of a packet-based timing protocol, according to an embodiment of the present invention. The methodology begins in block 1402 where packet-based traffic between nodes is intercepted by a PDV generator. In block 1404, packet delay and packet delay variation of the traffic are changed at the PDV generator in accordance with a packet delay variation test sequence. In block 1406, traffic is transmitted from the PDV generator in accordance with the changed packet delay and the changed packet delay variation. In block 1408, adaptive timing characteristics are evaluated in accordance with the packet delay variation sequence.

It should be noted that performance metrics for stressed evaluation criteria, such as, for example, MTIE stress test masks, should be specified for different services (Table 1) and various transmission facilities (Table 2).

TABLE 1

| Packet-based timing services | |
|---|---|
| Circuit Emulation Service Timing Method | Timing Emulation Service Timing Method |
| Differential | Adaptive - One Way |
| Buffer Adaptive | Adaptive - Two Way |

TABLE 2

| Packet-Based transmission bit rates |
|---|
| Transmission Facility Bit Rate |
| <10 MB/s |
| 10 MB/s |
| 100 MB/s |
| 1,000 MB/s |
| 10,000 MB/s |

In addition to the above criteria, different performance metrics may also be used to describe timing performance of "normal" or "stressed" packet transport conditions. Normal packet transport conditions represent those conditions where there are no failed packet transport elements (nodes or links) and where there is no packet loss.

The present invention may be implemented, at least in part, in the form of one or more integrated circuits. For example, a PDV generator in accordance with the invention may be implemented as one or more integrated circuits comprising at least one processor and at least one memory. Numerous other configurations are possible.

In such an integrated circuit implementation, a plurality of identical die is typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is also possible for the illustrative embodiments of the present invention to be implemented, at least in part, as a software program or any other logical method to process information.

Although illustrative embodiments of the present invention have been described herein with reference to the accompanying drawings, it is to be understood that the invention is not limited to those precise embodiments, and that various changes and modifications may be made therein by one skilled in the art without departing from the scope of the invention.

What is claimed is:

1. A method of testing adaptive timing characteristics of a packet-based timing protocol, comprising the steps of:

applying a packet delay variation test sequence to packet-based traffic as the packet-based traffic passes through a packet delay variation generator during transmission between nodes; and evaluating adaptive timing characteristics at a node that receives the packet-based traffic in accordance with the packet delay variation test sequence;

wherein applying the packet delay variation test sequence comprises changing at least one of packet delay and packet delay variation of the packet-based traffic at the packet delay variation generator in accordance with the packet delay variation test sequence;

wherein the packet delay variation test sequence comprises a test suite;

wherein the test suite comprises an initialization sequence and a delay variation sequence; and wherein the delay variation sequence comprises one or more single packet delay variation events and continuous packet delay variation events.

2. The method of claim 1, wherein the step of applying a packet delay variation test sequence further comprises the steps of:

intercepting packet-based traffic between nodes at the packet delay variation generator; and transmitting packet-based traffic from the packet delay variation generator in accordance with at least one of the changed packet delay and the changed packet delay variation.

3. The method of claim 1, wherein, in the step of applying a packet delay variation test sequence, the packet delay variation test sequence is applied in one transmission direction between nodes.

4. The method of claim 1, wherein, in the step of applying a packet delay variation test sequence, the packet delay variation test sequence is applied in both transmission directions between nodes.

5. The method of claim 4, wherein, in the step of applying a packet delay variation test sequence, the packet delay variation in one direction is the same as the packet delay variation in an opposing direction.

6. The method of claim 4, wherein, in the step of applying a packet delay variation test sequence, the packet delay variation in one direction is different than the packet delay variation in an opposing direction.

7. The method of claim 1, wherein a given single packet delay variation event comprises at least one of a step delay change, a pulse delay change, a ramp delay change and a step-ramp delay change.

8. The method of claim 1, wherein a given continuous packet delay variation event comprises at least one of a sine function periodic delay change, a triangular periodic delay change, and a square wave periodic delay change.

9. The method of claim 1, wherein the test suite further comprises a sequence having a low packet delay variation.

10. The method of claim 1, wherein, in the step of applying a packet delay variation test sequence, a user selects the packet delay variation test sequence.

11. The method of claim 1, wherein, in the steps of applying a packet delay variation test sequence and evaluating adaptive timing characteristics, the nodes comprise circuit emulation service interworking functions.

12. The method of claim 1, wherein, in the steps of applying a packet delay variation test sequence and evaluating adaptive timing characteristics, the nodes comprise timing emulation service interworking functions.

13. An article of manufacture for testing adaptive timing characteristics of a packet-based timing protocol, comprising a computer readable medium containing one or more programs which when executed implement the steps of the method of claim 1.

14. A method of testing adaptive timing characteristics of a packet-based timing protocol, comprising the steps of:
    applying a packet delay variation test sequence to packet-based traffic as the packet-based through a packet delay variation generator during transmission between nodes; and
    evaluating adaptive timing characteristics at a node that receives the packet-based traffic in accordance with the packet delay variation test sequence;
    wherein applying the packet delay variation test sequence comprises changing at least one of packet delay and packet delay variation of the packet-based traffic at the packet delay variation generator in accordance with the packet delay variation test sequence;
    wherein the packet delay variation test sequence comprises a test suite;
    wherein the test suite comprises an initialization sequence and a delay variation sequence; and
    wherein delay in the initialization sequence is kept at a steady state or varied in a deterministic pattern.

15. An integrated circuit device in a packet delay variation generator for testing adaptive timing characteristics of a packet-based timing protocol, wherein the integrated circuit device is configured to apply a packet delay variation test sequence to packet-based traffic as the packet-based traffic passes through the packet delay variation generator during transmission between nodes, such that adaptive timing characteristics can be evaluated at a node that receives the packet-based traffic in accordance with the packet delay variation test sequence, wherein applying the packet delay variation test sequence comprises changing at least one of packet delay and packet delay variation of the packet-based traffic at the packet delay variation generator in accordance with the packet delay variation test sequence;
    wherein the packet delay variation test sequence comprises a test suite;
    wherein the test suite comprises an initialization sequence and a delay variation sequence; and
    wherein the delay variation sequence comprises one or more single packet delay variation events and continuous packet delay variation events.

16. A packet-based network comprising:
a plurality of nodes between which packet-based traffic is passed;
a packet delay variation generator comprising an integrated circuit device configured to apply a packet delay variation test sequence to packet-based traffic as the packet-based traffic passes through a packet delay variation generator during transmission between nodes, wherein adaptive timing characteristics are evaluated at a node that receives the packet-based traffic in accordance with the packet delay variation test sequence, wherein applying the packet delay variation test sequence comprises changing at least one of packet delay and packet delay variation of the packet-based traffic at the packet delay variation generator in accordance with the packet delay variation test sequence;
    wherein the packet delay variation test sequence comprises a test suite;
    wherein the test suite comprises an initialization sequence and a delay variation sequence; and
    wherein the delay variation sequence comprises one or more single packet delay variation events and continuous packet delay variation events.

17. A packet delay variation generator configured to apply a packet delay variation test sequence to packet-based traffic as the packet-based traffic passes through the packet delay variation generator during transmission between nodes of a packet-based network, such that adaptive timing characteristics can be evaluated at a node that receives the packet-based traffic in accordance with the packet delay variation test sequence, wherein applying the packet delay variation test sequence comprises changing at least one of packet delay and packet delay variation of the packet-based traffic at the packet delay variation generator in accordance with the packet delay variation test sequence;
    wherein the packet delay variation test sequence comprises a test suite;
    wherein the test suite comprises an initialization sequence and a delay variation sequence; and
    wherein the delay variation sequence comprises one or more single packet delay variation events and continuous packet delay variation events.

18. A method of testing adaptive timing characteristics of a packet-based timing protocol, comprising the steps of
    applying a packet delay variation test sequence to packet-based traffic as the packet-based traffic passes through a packet delay variation generator during transmission between nodes; and
    evaluating adaptive timing characteristics at a node that receives the packet-based traffic in accordance with the packet delay variation test sequence;
    wherein applying the packet delay variation test sequence comprises changing at least one of packet delay and packet delay variation of the packet-based traffic at the packet delay variation generator in accordance with the packet delay variation test sequence;

wherein the packet delay variation test sequence comprises a continuous packet delay variation event; and wherein the continuous packet delay variation event comprises a periodic delay change which increases at a first rate and decreases at a second rate, the first rate being greater than the second rate.

19. A method of testing adaptive timing characteristics of a packet-based timing protocol, comprising the steps of:

applying a packet delay variation test sequence to packet-based traffic as the packet-based traffic passes through a packet delay variation generator during transmission between nodes; and evaluating adaptive timing characteristics at a node that receives the packet-based traffic in accordance with the packet delay variation test sequence;

wherein applying the packet delay variation test sequence comprises changing at least one of packet delay and packet delay variation of the packet-based traffic at the packet delay variation generator in accordance with the packet delay variation test sequence;

wherein the packet delay variation test sequence comprises a continuous packet delay variation event; and wherein the continuous packet delay variation event comprises a periodic delay change which increases at a first rate and decreases at a second rate, the first rate being less than the second rate.

\* \* \* \* \*

UNITED STATES PATENT AND TRADEMARK OFFICE
CERTIFICATE OF CORRECTION

| | | |
|---|---|---|
| PATENT NO. | : 7,848,242 B2 | Page 1 of 1 |
| APPLICATION NO. | : 11/762808 | |
| DATED | : December 7, 2010 | |
| INVENTOR(S) | : Bedrosian | |

It is certified that error appears in the above-identified patent and that said Letters Patent is hereby corrected as shown below:

Col. 9, line 42, please insert --traffic passes-- after "as the packet-based".

Signed and Sealed this
Fifteenth Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,848,242 B2 | Page 1 of 1 |
| APPLICATION NO. | : 11/762808 | |
| DATED | : December 7, 2010 | |
| INVENTOR(S) | : P. Stephan Bedrosian | |

It is certified that error appears in the above-identified patent and that said Letters Patent is hereby corrected as shown below:

In the claims:

Col. 9, line 42, please insert --traffic passes-- after "as the packet-based".

Signed and Sealed this
Twenty-ninth Day of March, 2011

David J. Kappos
*Director of the United States Patent and Trademark Office*